United States Patent
Koller et al.

(10) Patent No.: US 9,747,432 B1
(45) Date of Patent: Aug. 29, 2017

(54) REMOTELY ENABLING A DISABLED USER INTERFACE OF A WIRELESS COMMUNICATION DEVICE

(71) Applicant: Sprint Communications Company L.P., Overland Park, KS (US)

(72) Inventors: Gary Duane Koller, Overland Park, KS (US); Mark Douglas Peden, Olathe, KS (US); Raymond Emilio Reeves, Oviedo, FL (US); Thomas M. Koch, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 14/243,367

(22) Filed: Apr. 2, 2014

(51) Int. Cl.
    *G06F 21/36* (2013.01)

(52) U.S. Cl.
    CPC .................................. *G06F 21/36* (2013.01)

(58) Field of Classification Search
    CPC ....................................................... G06F 21/36
    See application file for complete search history.

(56) References Cited

U.S. PATENT DOCUMENTS

| | | | |
|---|---|---|---|
| 6,321,079 B1 | 11/2001 | Cooper | |
| 7,840,204 B2 | 11/2010 | Bandaru | |
| 8,204,494 B2 | 6/2012 | Weinzierl | |
| 8,600,351 B2 | 12/2013 | Dupuis et al. | |
| 2006/0156393 A1* | 7/2006 | Harwood et al. | 726/7 |
| 2009/0068984 A1* | 3/2009 | Burnett | H04M 1/663 455/408 |
| 2012/0084734 A1* | 4/2012 | Wilairat | G06F 21/36 715/863 |
| 2013/0031619 A1 | 1/2013 | Waltermann et al. | |
| 2013/0210389 A1* | 8/2013 | Obaidi | 455/411 |
| 2013/0305047 A1 | 11/2013 | Xi et al. | |
| 2014/0329500 A1* | 11/2014 | Wang et al. | 455/411 |

* cited by examiner

*Primary Examiner* — Matthew Smithers
*Assistant Examiner* — Mary Li

(57) ABSTRACT

A communication control system to control access to a wireless communication device comprises a communication transceiver and a processing system. The communication transceiver is configured to receive access information for the wireless communication device indicating a user interface access level and a user notice, and receive an access request to access a disabled user interface of the wireless communication device. The processing system is configured to authenticate and authorize the access request, and in response to authenticating and authorizing the access request, generate user interface control data that indicates the user interface access level and the user notice for the wireless communication device. The communication transceiver is configured to transfer the user interface control data for delivery to the wireless communication device, wherein the wireless communication device enables the user interface at the user interface access level and graphically displays the user notice responsive to the user interface control data.

20 Claims, 6 Drawing Sheets

REMOTELY ENABLING A DISABLED USER INTERFACE OF A WIRELESS COMMUNICATION DEVICE

TECHNICAL BACKGROUND

To establish a communication session with a wireless access network, a user operates a wireless communication device to communicate in a wireless protocol with a wireless access node. Once the communication session is established, the wireless access node exchanges the user communications with other systems and communication networks in order to provide a communication service, such as telephony voice communications or data access over the Internet. The user operates the wireless communication device by interacting with a user interface of the device. In some examples, the user interface could comprise a touch display that enables the user to provide user input commands by physically touching the display screen using a finger or stylus. Some wireless communication devices may also comprise user interfaces that are responsive to other user inputs besides touch displays, such as physical buttons, voice commands, movement or orientation of the device detected by accelerometers, and other user input techniques.

Wireless communication devices typically have a feature to disable the user interface. For example, the user may lock the display screen of the user interface by physically turning off the screen, or the display screen may be configured to lock automatically after a certain amount of time has elapsed. Typically, the user may set a password, pin number, unlock pattern, or some other security measure to prevent unauthorized access to the wireless communication device.

OVERVIEW

A method of operating a communication control system to control access to a wireless communication device is disclosed. The method comprises receiving access information for the wireless communication device indicating a user interface access level and a user notice. The method further comprises receiving an access request to access a disabled user interface of the wireless communication device, and in response, authenticating and authorizing the access request. The method further comprises, in response to authenticating and authorizing the access request, generating user interface control data that indicates the user interface access level and the user notice for the wireless communication device. The method further comprises transferring the user interface control data for delivery to the wireless communication device, wherein the wireless communication device enables the user interface at the user interface access level and graphically displays the user notice responsive to the user interface control data.

A communication control system to control access to a wireless communication device comprises a communication transceiver and a processing system. The communication transceiver is configured to receive access information for the wireless communication device indicating a user interface access level and a user notice, and receive an access request to access a disabled user interface of the wireless communication device. The processing system is configured to, in response to receiving the access request, authenticate and authorize the access request, and in response to authenticating and authorizing the access request, generate user interface control data that indicates the user interface access level and the user notice for the wireless communication device. The communication transceiver is configured to transfer the user interface control data for delivery to the wireless communication device, wherein the wireless communication device enables the user interface at the user interface access level and graphically displays the user notice responsive to the user interface control data.

A computer apparatus to operate a communication control system to control access to a wireless communication device comprises software instructions and at least one non-transitory computer-readable storage medium storing the software instructions. The software instructions are configured, when executed by the communication control system, to direct the communication control system to receive access information for the wireless communication device indicating a user interface access level and a user notice, and receive an access request to access a disabled user interface of the wireless communication device. The software instructions are further configured to direct the communication control system to, in response to receiving the access request, authenticate and authorize the access request. The software instructions are further configured to direct the communication control system to, in response to authenticating and authorizing the access request, generate user interface control data that indicates the user interface access level and the user notice for the wireless communication device. The software instructions are further configured to direct the communication control system to transfer the user interface control data for delivery to the wireless communication device, wherein the wireless communication device enables the user interface at the user interface access level and graphically displays the user notice responsive to the user interface control data.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
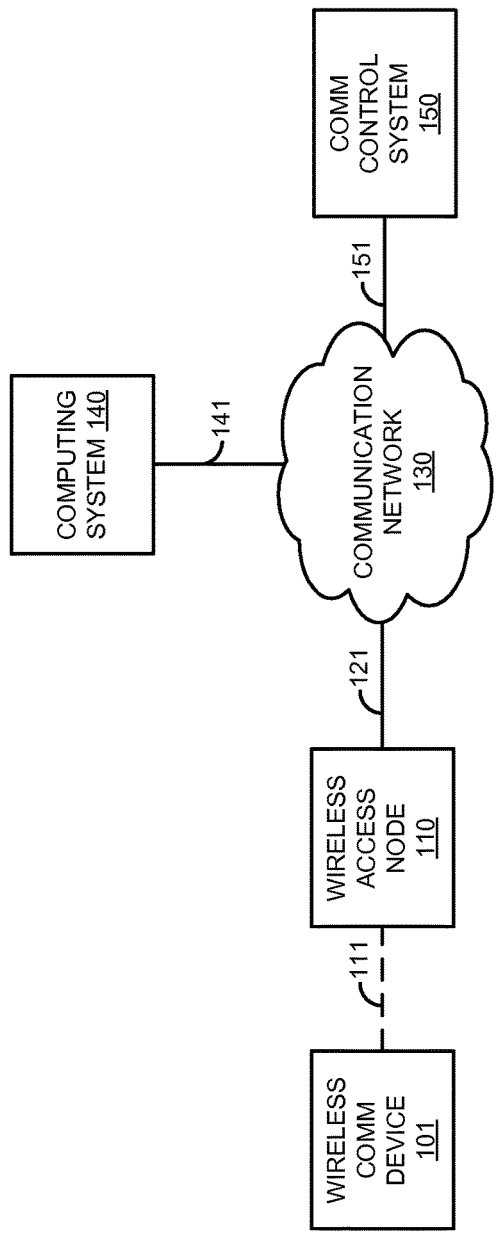
FIG. 1 is a block diagram that illustrates a communication system.

FIG. 1 is a block diagram that illustrates communication system 100. Communication system 100 includes wireless communication device 101, wireless access node 110, communication network 130, computing system 140, and communication control system 150. Wireless communication device 101 and wireless access node 110 are in communication over wireless communication link 111. Wireless access node 110 and communication network 130 communicate over communication link 121. Communication network 130 and computing system 140 are in communication over communication link 141. Communication network 130 and communication control system 150 communicate over communication link 151.

Figure 2:
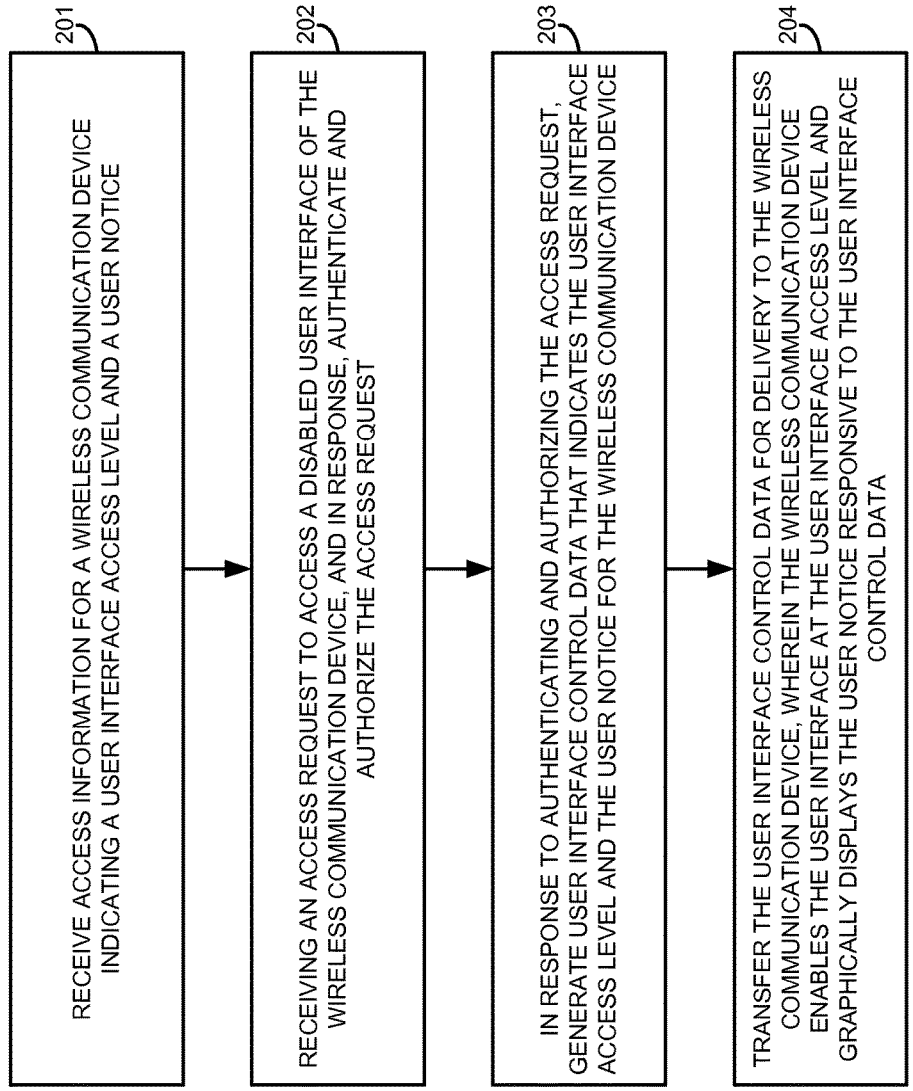
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by communication control system 150 to control access to wireless communication device 100.

As shown in the operational flow of FIG. 2, communication control system 150 receives access information for wireless communication device 101 indicating a user interface access level and a user notice (201). Typically, the access information for wireless communication device 101 is provided by an owner of wireless communication device 101, although the access information could be supplied by a third party in some examples. For example, the owner of wireless communication device 101 could provide the access information to communication control system 150 using computing system 140 via communication network 130. In some examples, a user of wireless communication device 101 could enter the access information into wireless communication device 101 which could then transmit the access information for delivery to communication control system 150. Other techniques for communication control system 150 to receive the access information are possible, including transmission from other communication networks, network elements, systems, or devices.

The access information for wireless communication device 101 indicates a user interface access level and a user notice. The user interface access level typically describes an extent to which a user interface of wireless communication device 101 should be enabled in response to an access request to access a disabled user interface of wireless communication device 101. For example, the user interface access level could indicate what features and functionality of the user interface will be activated on wireless communication device 101. The user notice could comprise any information the owner of wireless communication device 101 desires to display, such as a notification message, contact information, instructions, and the like.

Communication control system 150 receives an access request to access a disabled user interface of wireless communication device 101, and in response, authenticates and authorizes the access request (202). The access request would not typically be received from wireless communication device 101 due to device 101 having a disabled user interface, which would prevent a user from operating device 101 in a fully operational manner as when the user interface is enabled. Thus, the owner of wireless communication device 101 or some other third party user would typically utilize an alternative device, such as computing system 140, in order to transfer the access request for delivery to communication control system 150 over communication network 130. In some examples, communication control system 150 could authenticate and authorize the access request by exchanging security data between communication control system 150 and a user computer, such as computing system 140. The access request could include information required by communication control system 150 to authenticate and authorize the access request, such as a password, personal identification number (PIN), device identifier, security token, encryption key, or some other response to a security challenge—including combinations thereof. The access request would also typically identify wireless communication device 101 by some type of identifier, such as a Mobile Station International Subscriber Directory Number (MSISDN) or some other telephone number, Electronic Serial Number (ESN), Mobile Equipment Identifier (MEID), International Mobile Equipment Identity (IMEI), Media Access Control Identifier (MACID), or some other identifier that uniquely identifies wireless communication device 101—including combinations thereof. Communication control system 150 could then utilize the information received in the access request to authenticate and authorize the access request to access a disabled user interface of wireless communication device 101.

In response to authenticating and authorizing the access request, communication control system 150 generates user interface control data that indicates the user interface access level and the user notice for wireless communication device 101 (203). Typically, the user interface control data generated by communication control system 150 is designed to direct wireless communication device 101 to enable the user interface at the user interface access level specified in the access information. In some examples, communication control system 150 could receive several different user interface access levels in the access information, along with varying degrees of authentication requirements associated with each of the different access levels. For example, greater authentication requirements having higher levels of security may be required for higher user interface access levels to enable greater functionality of the user interface. The user interface control data also includes the user notice for wireless communication device 101 to display.

Communication control system 150 transfers the user interface control data for delivery to wireless communication device 101, wherein wireless communication device 101 enables the user interface at the user interface access level and graphically displays the user notice responsive to the user interface control data (204). The user interface of wireless communication device 101 could comprise a touch display in some examples, and device 101 could thus enable the touch display of the user interface at the user interface access level and graphically display the user notice on the touch display responsive to the user interface control data. In some examples, if the user interface access level specifies a lower level of access, wireless communication device 101 would enable the user interface to display the user notice but prevent all other functionality of device 101 from operating, such as access to applications, data usage, media content such as images, audio, and video files, short message service (SMS) text messages, voice calls, and other operations of device 101. The user notice that is graphically displayed by wireless communication device 101 could comprise device owner contact information, a user message, device usage instructions, or some other information provided in the access information—including combinations thereof.

The user interface access level specifies restrictions on the operations of wireless communication device 101 that the user may perform when the user interface of device 101 is enabled at the user interface access level. For example, the user interface access level could enable the user interface to allow for placing a voice call or sending an SMS message restricted to a particular telephone number or set of numbers, such as the telephone number of the device owner. In some examples, the user interface access level is restricted to a graphical presentation of the user notice responsive to user inputs, data communications with a designated user responsive to user inputs, access to designated data files responsive to user inputs, and access to designated software applications responsive to user inputs—including combinations thereof. Other limitations on the usage of wireless communication device 101 could be restricted via the user interface according to the user interface access level and are within the scope of this disclosure.

Advantageously, the operational flow of FIG. 2 describes how communication control system 150 may operate to grant restricted access to a disabled user interface of wireless communication device 101. By authenticating and authorizing an access request, communication control system 150 ensures that only authorized users are allowed to access wireless communication device 101. The user interface control data generated by communication control system 150 and transferred for delivery to wireless communication device 101 functions to direct device 101 to enable its user interface at the user interface access level, which typically provides some restrictions on the usage of wireless communication device 101. In this manner, the owner of wireless communication device 101 is able to control how third parties may access device 101 through its user interface, thereby protecting the privacy of the device owner.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, tablet, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Computing system 140 comprises a processing system and communication transceiver. Computing system 140 may also include other components such as a router, server, data storage system, and power supply. Computing system 140 may reside in a single device or may be distributed across multiple devices. Computing system 140 may be a discrete system or may be integrated within other systems—including other systems within communication system 100. In some examples, computing system 140 could comprise a wireless communication device, personal computer, telephone, tablet, transceiver, smartphone, PDA, e-book, game console, mobile Internet device, wireless network interface card, media player, Internet access node, application server, service node, or some other computing apparatus—including combinations thereof.

Communication control system 150 comprises a processing system and communication transceiver. Communication control system 150 may also include other components such as a router, server, data storage system, and power supply. Communication control system 150 may reside in a single device or may be distributed across multiple devices. Communication control system 150 may be a discrete system or may be integrated within other systems—including other systems within communication system 100. In some examples, communication control system 150 could comprise a computing system, device management system, open mobile alliance device management (OMA-DM) application server, over-the-air service provisioning (OTASP) server, session initiation protocol (SIP) server, authentication, authorization, and accounting (AAA) server, home agent, packet data serving node (PDSN), network switch, mobile switching center, router, switching system, packet gateway, network gateway system, Internet access node, application server, service node, firewall, or some other communication system—including combinations thereof.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 141, and 151 may use metal, air, space, optical fiber such as glass or plastic, or some other material as the transport medium—including combinations thereof. Communication links 121, 141, and 151 could use various communication protocols, such as TDM, IP, Ethernet, telephony, optical networking, hybrid fiber coax (HFC), communication signaling, wireless protocols, or some other communication format—including combinations thereof. Communication links 121, 141, and 151 may be direct links or could include intermediate networks, systems, or devices.

Figure 3:
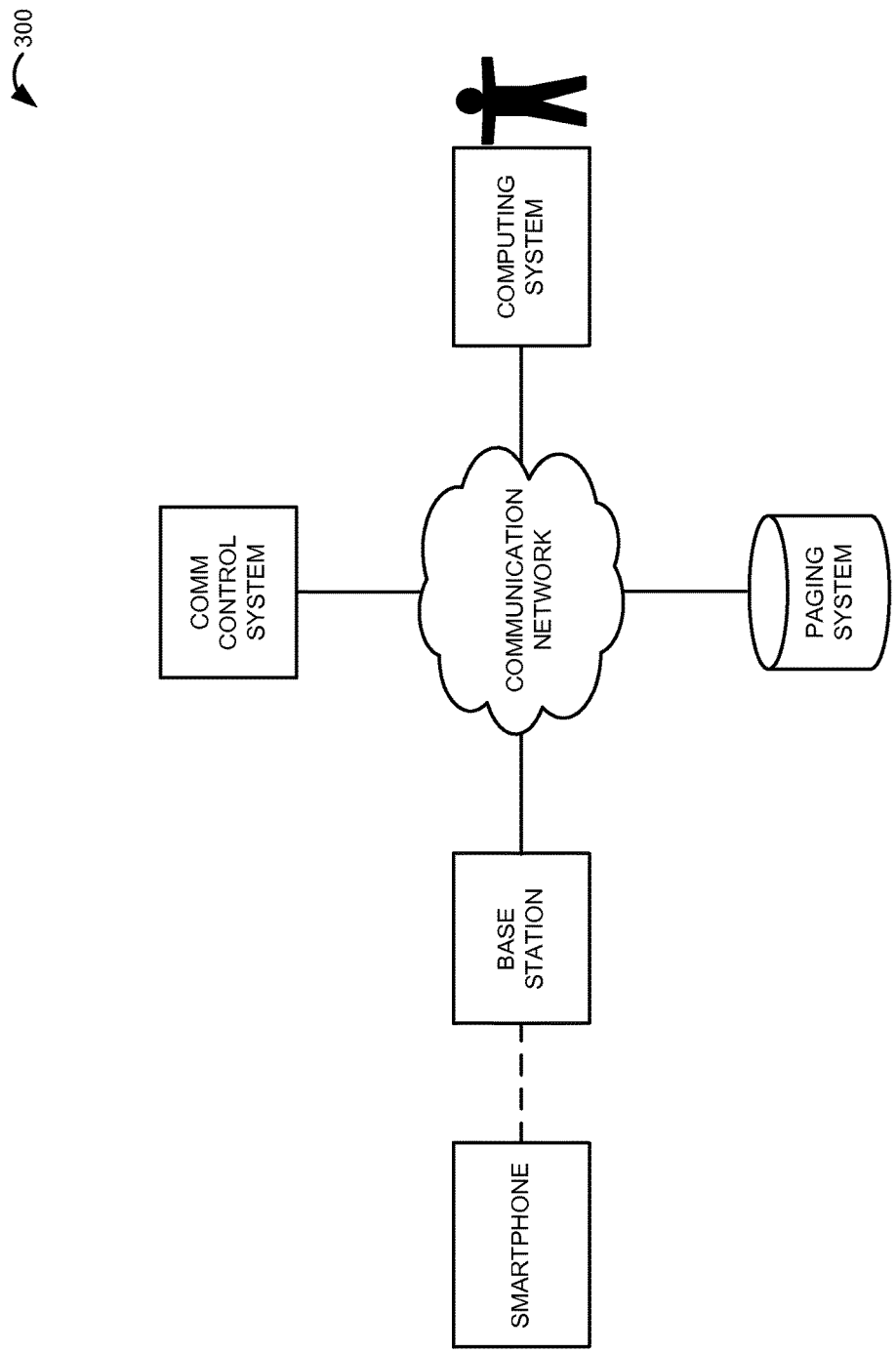
FIG. 3 is a block diagram that illustrates a communication system in an exemplary embodiment.

FIG. 3 is a block diagram that illustrates communication system 300. Communication system 300 includes a base station that is in communication with the communication network over a backhaul link. Communication system 300 also includes a smartphone device that is served by the base station. The base station provides a cell having a wireless coverage area that is defined by the signal propagation characteristics and coverage capabilities of the base station. A communication control system and a paging system are both in communication with the communication network. Communication system 300 also shows a user proximate to a computing system that is in communication with the communication network, typically via another communication network, such as the Internet.

In this example, the user operating the computing system is the owner of the smartphone. In operation, the user operates the computing system to enable or at least partially enable a disabled user interface of the smartphone. For example, the user may have entered a personal lock code on the smartphone which is configured to keep the user interface in a locked state until the user enters the personal lock code into the smartphone using the user interface. A detailed description of how the owner of the smartphone can remotely unlock or at least partially unlock the user interface of the smartphone using the remote computing system will now be discussed with respect to FIG. 4.

Figure 4:
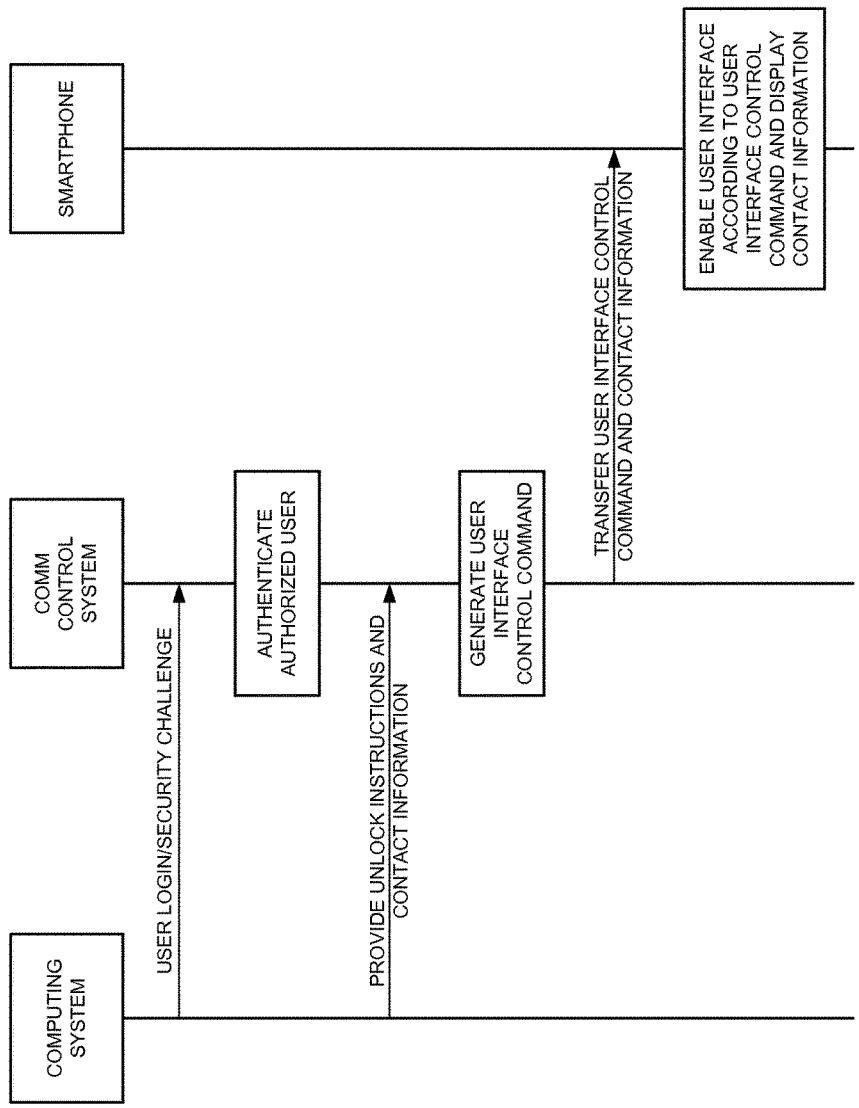
FIG. 4 is a sequence diagram that illustrates an operation of the communication system in an exemplary embodiment.

FIG. 4 is a sequence diagram that illustrates an operation of communication system 300 in an exemplary embodiment. In this example, the smartphone has been lost or misplaced by its owner. Prior to losing the smartphone, the owner programmed a private lock code into the smartphone known only to the owner, which effectively disables the user interface until the lock code is provided. The owner desires to enable limited functionality of the user interface and to display contact information in case a third party recovers the smartphone.

In order to at least partially unlock the user interface of the smartphone remotely and provide the contact information, the owner operates the computing system which is in communication with the communication network and the communication control system. In this example, the owner accesses a website having a web entry form to enter a user login and answer one or more security challenges in order to authenticate and authorize the owner of the smartphone, such as providing a password, PIN number, and the like. The website transmits the information submitted by the owner over the Internet for delivery to the communication control system via the communication network. The communication control system processes the user login and security information in order to authenticate and authorize the owner of the smartphone.

Once the owner has been authenticated and authorized to access the service, the owner submits unlock instructions and contact information using the computing system which transmits this information for delivery to the communication control system. The unlock instructions specify the level of functionality the owner desires to enable for the user interface of the smartphone. In this example, since the owner does not know who may have discovered the smartphone, the owner specifies an extremely restricted user interface level which only displays the user-supplied notification message having the owner's contact information and the option to call or send an SMS text message to the phone number specified by the owner, which could be the owner's home telephone number or an alternate cellular phone number. All of the other functionality of the phone, such as access to media content, software applications, web browsing, data usage, call and message history, and the like would be disabled by the user interface pursuant to the owner's unlock instructions.

The communication control system receives the owner's unlock instructions and contact information and generates a user interface control command that directs the smartphone to enable the user interface to the degree specified in the unlock instructions. The communication control system then transfers the user interface control command and the notification message having the owner's contact information for delivery to the smartphone. In some examples, the communication control system could encrypt the user interface control command with a shared secret encryption key or some other security algorithm stored in the smartphone in order for the smartphone to authenticate the command for added security. The communication control system could leverage the existing paging system of the communication network to transmit the user interface control command as an unlock page for delivery to the smartphone in some examples. Once the smartphone receives the user interface control command and the contact information, the smartphone responsively enables the user interface according to the owner's unlock instructions included in the user interface control command and displays the owner's contact information. In this manner, a third party who finds the lost smartphone is informed of the owner's contact information and may utilize the smartphone to contact the owner, but all other functionality of the smartphone is blocked by the user interface pursuant to the owner's unlock instructions.

In some examples, the owner of the smartphone could specify to enable greater functionality of the smartphone, including completely unlocking the user interface in some examples. For example, the smartphone may be owned by a parent or guardian of a child who has given the smartphone to the child to use. If the child enters a lock code into the smartphone known only to the child, there could be circumstances when the parent may wish to fully unlock the user interface of the smartphone owned by the parent, such as when the child forgets the lock code. Advantageously, the parent could employ the service provided by the communication control system described above to fully enable the user interface of the smartphone. In another example, a law enforcement agency could utilize the above techniques to at least partially enable the user interface of a suspect's smartphone when they establish the legal right to do so, such as by providing a subpoena or warrant. In this case, a user notice could be displayed on the user interface of the smartphone indicating device usage instructions, such as a notification that the device has been unlocked pursuant to the subpoena or warrant for investigative purposes.

In some examples, the communication control system could comprise a device management system that provides various services, such as device provisioning, activation, configuration, software upgrades, and fault management. Critical parameters are typically passed securely from the device management system to a wireless communication device to support these functions using over-the-air (OTA) device management protocols, such as open mobile alliance device management (OMA-DM) or over-the-air service provisioning (OTASP). In some examples, the communication control system could utilize such OTA device management protocols to transfer the messages described above to the smartphone, such as user interface control data and instructions, user interface access levels, user notices, and the like. However, in order to receive OTA device management, the smartphone typically needs to successfully register with the wireless communication network in order to establish a data session with the device management system.

In some instances, the smartphone may not be allowed to register with the communication network, such as when the owner of the smartphone has unpaid service bills or has exhausted a supply of prepaid minutes. In this case, when communication control system authenticates the user request and receives the unlock instructions from the authorized user, the communication control system could ensure the device can register with the network so that it may receive the user interface control command. To achieve this, the communication control system could create specialized communication session rules for the ESN or MEID of the smartphone and add them to the AAA server or prepaid database, which would allow the smartphone to register with the network for the sole purpose of receiving the user interface control command, an unlock page, or the like. The disabled user interface of the smartphone could then be partially or fully enabled pursuant to the control signals transferred to the smartphone. In some examples, the communication control system could also provide a data connection for the smartphone to access an unlock server of the device manufacturer so that the device manufacturer could provide a master unlock code for the device when appropriate.

Beneficially, an authorized user, such as the owner of the smartphone, can utilize the techniques described above to partially enable a disabled user interface of the smartphone from a remote computing system. Along with the instructions to partially enable the user interface, the owner can provide a user notification message for display on the screen of the smartphone. In this manner, the owner can remotely enable limited use of the smartphone to a third party who may discover the owner's lost smartphone, along with directing the smartphone to display the user notification, such as the owner's contact information, thereby increasing the likelihood that the owner will be contacted by the finder and recover the lost smartphone.

Figure 5:
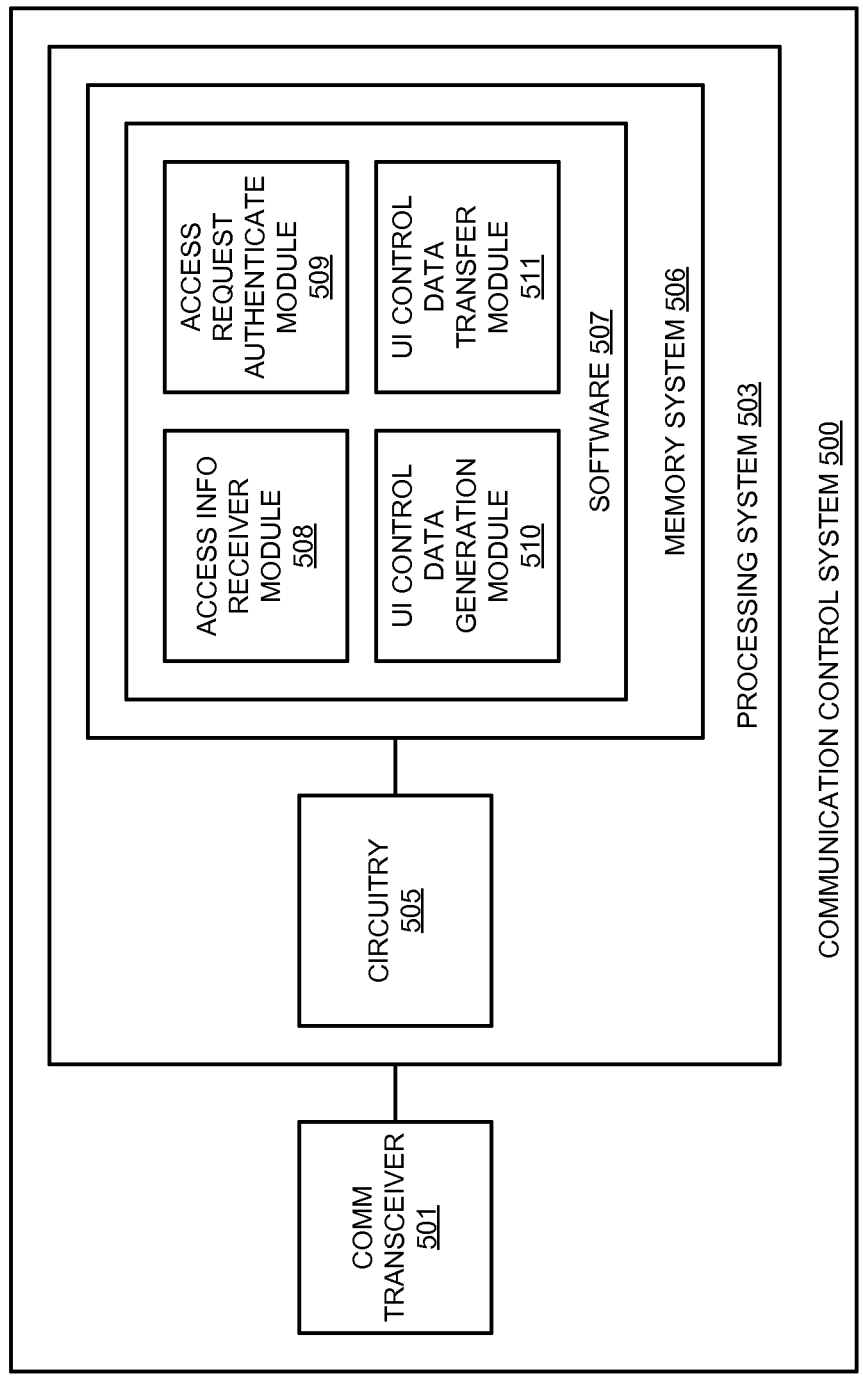
FIG. 5 is a block diagram that illustrates a communication control system.

FIG. 5 is a block diagram that illustrates communication control system 500. Communication control system 500 provides an example of communication control system 150, although system 150 may use alternative configurations. Communication control system 500 comprises communication transceiver 501 and processing system 503. Processing system 503 is linked to communication transceiver 501. Processing system 503 includes processing circuitry 505 and memory device 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to receive access information for a wireless communication device indicating a user interface access level and a user notice. Communication transceiver 501 could also be configured to receive an access request to access a disabled user interface of the wireless communication device, and transfer user interface control data for delivery to the wireless communication device.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for user identifier database system 140. In particular, operating software 507 may direct processing system 503 to direct communication transceiver 501 to receive access information for the wireless communication device indicating a user interface access level and a user notice, and receive an access request to access a disabled user interface of the wireless communication device. In addition, operating software 507 directs processing system 503 to, in response to receiving the access request, authenticate and authorize the access request. Further, operating software 507 directs processing system 503 to, in response to authenticating and authorizing the access request, generate user interface control data that indicates the user interface access level and the user notice for the wireless communication device. Operating software 507 also directs processing system 503 to direct communication transceiver 501 to transfer the user interface control data for delivery to the wireless communication device, wherein the wireless communication device enables the user interface at the user interface access level and graphically displays the user notice responsive to the user interface control data.

In some examples, operating software 507 could comprise an access information receiver software module 508 that receives access information for a wireless communication device indicating a user interface access level and a user notice. Additionally, operating software 507 could comprise an access request authentication software module 509 that receives an access request to access a disabled user interface of the wireless communication device, and in response, authenticates and authorizes the access request. Further, operating software 507 could comprise a user interface control data generation software module 510 that, in response to authenticating and authorizing the access request, generates user interface control data that indicates the user interface access level and the user notice for the wireless communication device. Finally, operating software 507 could comprise a user interface control data transfer software module 511 that transfers the user interface control data for delivery to the wireless communication device, wherein the wireless communication device enables the user interface at the user interface access level and graphically displays the user notice responsive to the user interface control data.

Figure 6:
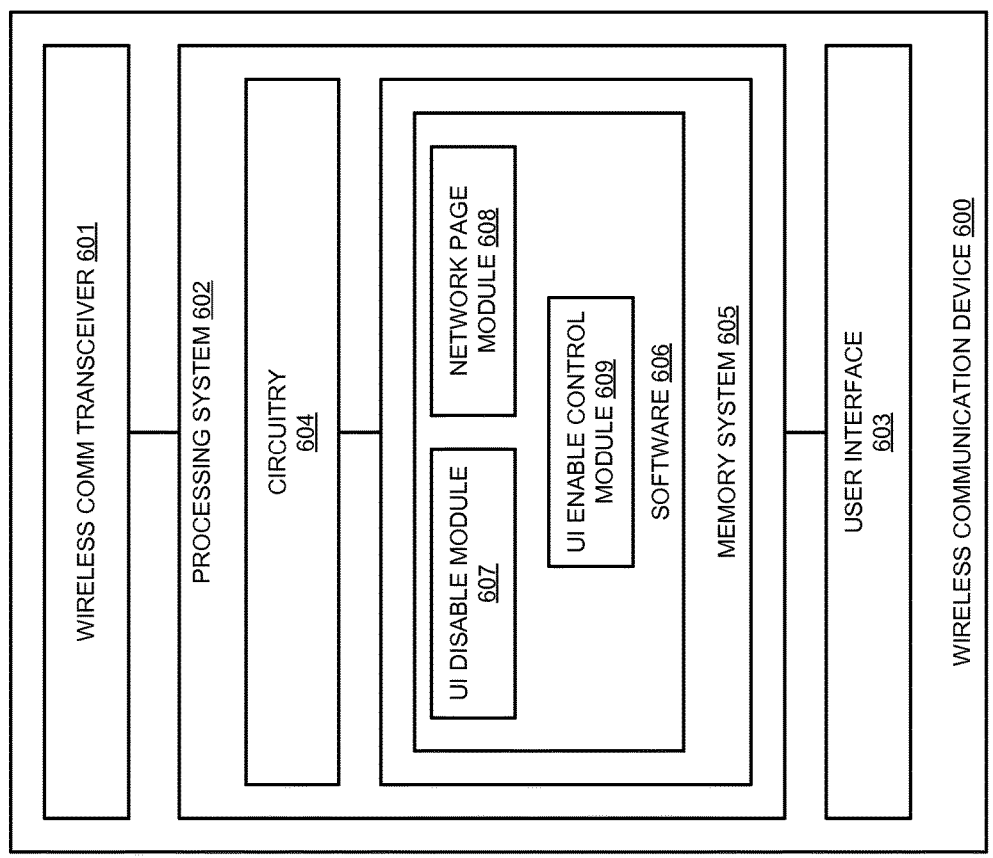
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-609. Wireless communication device 600 may include other well-known components such as a battery and enclosure that are not shown for clarity. Wireless communication device 600 may comprise a telephone, transceiver, mobile phone, cellular phone, smartphone, computer, PDA e-book, tablet, game console, mobile Internet device, wireless network interface card, media player, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, 3GPP LTE, LTE Advanced, WiMAX, Wi-Fi, Bluetooth, Internet, telephony, or some other wireless communication format. In some examples, wireless communication transceiver 601 may be configured to receive user interface control data that indicates a user interface access level and a user notice for wireless communication device 600.

User interface 603 comprises components that interact with a user to receive user inputs and to present media and/or information. User interface 603 may include a speaker, microphone, buttons, lights, display screen, touchscreen, touch pad, scroll wheel, communication port, or some other user input/output apparatus—including combinations thereof. User interface 603 may be fully or partially enabled or disabled in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of wireless communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-609, although software 606 could have alternative configurations in other examples.

When executed by processing circuitry 604, operating software 606 directs processing system 602 to operate wireless communication device 600 as described herein for wireless communication device 101. In particular, operating software 606 directs processing system 602 to direct wireless communication transceiver 601 to receive user interface control data that indicates a user interface access level and a user notice for wireless communication device 600. Further, operating software 606 directs processing system 602 to enable user interface 603 at the user interface access level and graphically display the user notice responsive to the user interface control data.

In this example, operating software 606 comprises a user interface disable software module 607 that disables user interface 603 of wireless communication device 600. For example, the user interface disable module 607 could be used to lock user interface 603. Operating software 606 also comprises a network page software module 608 that receives network pages transmitted from a communication network, including user interface control data comprising a user interface access level and a user notice. The network page software module 608 may also provide the user interface control data to a user interface enablement controller software module 609. The user interface enablement controller software module 609 may receive the user interface control data from the network page software module 608, authenticate the user interface control data, enable user interface 603 at the user interface access level indicated in the user interface control data, and graphically display the user notice on a display screen of user interface 603.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication control system to control access to a wireless communication device, the method comprising:
receiving access information for the wireless communication device indicating a user interface access level and a user notice, wherein the user interface access level specifies a set of functions of the wireless communication device that a user is permitted to access through a user interface and the user notice comprises device owner contact information;
receiving an access request to access the user interface of the wireless communication device when the user interface is disabled, and in response, authenticating and authorizing the access request;
in response to authenticating and authorizing the access request, generating user interface control data that indicates the user interface access level and the user notice for the wireless communication device; and
transferring the user interface control data for delivery to the wireless communication device, wherein, responsive to the user interface control data, the wireless communication device is configured to enable the user interface at the user interface access level by granting the user access to the set of functions of the wireless communication device that the user is permitted to access through the user interface as specified by the user interface access level and graphically display the user notice comprising the device owner contact information.

2. The method of claim 1 wherein the user interface access level is restricted to an ability to contact an owner of the wireless communication device using the device owner contact information.

3. The method of claim 1 wherein the user notice comprises a user message provided in the access information.

4. The method of claim 1 wherein the user notice comprises device usage instructions.

5. The method of claim 1 wherein the user interface access level is restricted to a graphical presentation of the user notice responsive to user inputs.

6. The method of claim 1 wherein the user interface access level is restricted to a graphical presentation of the user notice and data communications with a designated user responsive to user inputs.

7. The method of claim 1 wherein the user interface access level is restricted to a graphical presentation of the user notice and access to designated data files responsive to user inputs.

8. The method of claim 1 wherein the user interface access level is restricted to a graphical presentation of the user notice and access to designated software applications responsive to user inputs.

9. The method of claim 1 wherein authenticating and authorizing the access request comprises exchanging security data between the communication control system and a user computer.

10. The method of claim 1 wherein the user interface comprises a touch display.

11. A communication control system to control access to a wireless communication device, the communication control system comprising:
a communication transceiver configured to receive access information for the wireless communication device indicating a user interface access level and a user notice, and receive an access request to access a user interface of the wireless communication device when the user interface is disabled; and
a processing system configured to, in response to receiving the access request, authenticate and authorize the access request, and in response to authenticating and authorizing the access request, generate user interface control data that indicates the user interface access level and the user notice for the wireless communication device, wherein the user interface access level specifies a set of functions of the wireless communication device that a user is permitted to access through the user interface and the user notice comprises device owner contact information;
the communication transceiver configured to transfer the user interface control data for delivery to the wireless communication device, wherein, responsive to the user interface control data, the wireless communication device is configured to enable the user interface at the user interface access level by granting the user access to the set of functions of the wireless communication device that the user is permitted to access through the user interface as specified by the user interface access level and graphically display the user notice comprising the device owner contact information.

12. The communication control system of claim 11 wherein the user interface access level is restricted to an ability to contact an owner of the wireless communication device using the device owner contact information.

13. The communication control system of claim 11 wherein the user notice comprises a user message provided in the access information.

14. The communication control system of claim 11 wherein the user notice comprises device usage instructions.

15. The communication control system of claim 11 wherein the user interface access level is restricted to a graphical presentation of the user notice responsive to user inputs.

16. The communication control system of claim 11 wherein the user interface access level is restricted to a graphical presentation of the user notice and data communications with a designated user responsive to user inputs.

17. The communication control system of claim 11 wherein the user interface access level is restricted to a graphical presentation of the user notice and access to designated data files responsive to user inputs.

18. The communication control system of claim 11 wherein the user interface access level is restricted to a graphical presentation of the user notice and access to designated software applications responsive to user inputs.

19. The communication control system of claim 11 wherein the processing system configured to authenticate and authorize the access request comprises the processing system configured to exchange security data between the communication control system and a user computer.

20. A computer apparatus to operate a communication control system to control access to a wireless communication device, the apparatus comprising:
software instructions configured, when executed by the communication control system, to direct the communication control system to receive access information for the wireless communication device indicating a user interface access level and a user notice, wherein the user interface access level specifies a set of functions of the wireless communication device that a user is permitted to access through a user interface and the user notice comprises device owner contact information, receive an access request to access the user interface of the wireless communication device when the user interface is disabled, and in response, authenticate and authorize the access request, and in response to authenticating and authorizing the access request, generate user interface control data that indicates the user interface access level and the user notice for the wireless communication device, and transfer the user interface control data for delivery to the wireless communication device, wherein the wireless communication device is configured to, responsive to the user interface control data, enable the user interface at the user interface access level by granting the user access to the set of functions of the wireless communication device that the user is permitted to access through the user interface as specified by the user interface access level, and graphically display the user notice comprising the device owner contact information; and at least one non-transitory computer-readable storage medium storing the software instructions.

* * * * *